Patented Feb. 2, 1943

2,309,806

UNITED STATES PATENT OFFICE 2,309,806

PRODUCTION OF MONOHALONITROMETHANES

John B. Tindall, Terre Haute, Ind., assignor to Commercial Solvents Corporation, Terre Haute, Ind., a corporation of Maryland No Drawing. Application December 6, 1940, Serial No. 368,905

3 Claims. (Cl. 260—644)

My invention relates to a process for the preparation of bromo- and chloronitromethanes (to be hereinafter referred to as halonitromethanes, etc.) More particularly, it is concerned with a convenient and economical method for the preparation of the above nitromethane derivatives by chlorinating or brominating (to be hereinafter referred to as halogenating) an aqueous solution of an alkali metal salt of nitromethane whereby the amount of polyhalogenated products thus produced is reduced to a minimum.

Previously the above-mentioned halogenated derivatives of nitromethane have been prepared by adding the solid alkali metal salt of nitromethane to chlorine or bromine water at relatively low temperature (10° C.) The yields of said derivatives obtainable by such procedure, however, have not been sufficiently good to warrant the commercial application thereof. Because of the high degree of instability of aqueous solutions of the alkali metal salts of nitromethane, said salts cannot be recovered therefrom in the solid form as such. In order to obtain said salt in solid form, the same must be prepared from the alkali metal alcoholate, which in turn is prepared from the free alkali metal and the desired alcohol, and an ethereal solution of nitromethane, said salt being recovered by filtration. It is obvious that such a procedure is economically impractical from the standpoint of time involved, as well as the expense of the reagents employed.

Other methods for the preparation of halonitromethanes, and similar halonitroalkanes, have been concerned with halogenating an alkaline solution of the alkali metal nitroparaffin salt, either directly or by treating said salt with a solution consisting of the halogen dissolved in carbon tetrachloride. This procedure is likewise objectionable since it has been found that excess alkalinity during the halogenation reaction promotes the formation of polyhalogenated nitroalkanes, and accordingly tends to reduce the yield of the desired monohalonitroalkane.

I have now discovered that monohalogenated derivatives of nitromethane can be economically produced in much improved yields by halogenating a freshly-prepared solution of an alkali metal salt of nitromethane. I have further found that by utilization of my new process, the extent to which the higher halogenated derivatives of nitromethane tend to be formed, is reduced to a minimum, since under the reaction conditions employed there is substantially no excess alkaline material present in the nitromethane salt solution when halogenation occurs.

At this point it is to be specifically understood that while the procedure described, and the examples appearing below only refer to the application of chlorine to my invention, bromine, as generally disclosed above, may also be employed with similar results. It will of course be evident, however, that due to the fact that chlorine is preferably employed in the gaseous state and bromine in the liquid form, obvious modificatons in the procedure outlined, when using the latter, will be necessary.

In its preferred embodiment, my invention is carried out by introducing separately and simultaneously, approximately equivalent quantities of aqueous solutions of nitromethane and a basic alkali metal compound, preferably, the hydroxide, into a vertically-positioned and externally-cooled column (reaction chamber) which is in communication with a suitable chlorination chamber, likewise cooled externally. The alkali metal salt of nitromethane is formed as the two said aqueous solutions flow downwardly through said column, and as said salt is formed, it immediately drops into the chlorination chamber below which contains at least sufficient water to cover the open end of the delivery tube through which chlorine is introduced. Formation of chloronitromethane appears to occur immediately upon contact of chlorine with the alkali metal salt of nitromethane, and although the chloronitromethane thus produced is heavier than water, it is more or less uniformly dispersed throughout the aqueous medium, due to the turbulence resulting from the introduction of gaseous chlorine. As the reaction proceeds, the liquid level in the chlorination chamber rises gradually, and the liquid, containing chloronitromethane, is withdrawn at a point conveniently located near the top of the said chlorination chamber, and substantially above the lower end of the column through which the aqueous salt solution is introduced. After the entire volumes of the aqueous nitromethane and alkaline solutions have been added in the manner described above, the introduction of chlorine is stopped, the liquid remaining in the chlorination chamber removed therefrom and combined with the overflow liquid, after which the entire volume of said liquid is subjected to steam distillation. The chloronitromethane layer may be separated from the distillate by any convenient means and further purified by fractional distillation under vacuum. Since chloronitromethane is soluble in water to a considerable extent, there is found an appreciable amount of this material in the original water layer obtained by steam distillation. Such chloronitromethane may be readily recovered from said water layer by steam-distilling the latter. This process may be repeated until it appears, from the volume of chloronitromethane so recovered, that further distillation is unwarranted.

Since such reactions are of an exothermic character, the rate at which chlorination is allowed to occur, necessitates careful regulation. In general I have found it desirable to introduce the chlorine at a molar rate which is at least equivalent to the rate at which the nitromethane salt solution is introduced. By introducing the reactants at such a rate the temperature at which chlorination is carried out does not substantially exceed 50° C., in fact the temperature under such conditions is seldom found to appreciably exceed 30° C. Satisfactory temperature control may be accomplished by enclosing a tube of convenient length and diameter in a suitable jacket through which cold water may be kept continuously flowing. Likewise, it is highly desirable to maintain the column through which the aqueous alkaline solution and aqueous nitromethane flow, at a temperature not in substantial excess of 30° C., since heat tends to rapidly decompose the alkali metal salts of nitromethane. Any suitable means may be employed for providing a column, the temperature of which is capable of being controlled within the above-stated range. For example, said column may be of substantially the same design as the chlorination chamber mentioned above. The chlorination chamber and the column in which the alkali metal salt of nitromethane is formed, are preferably constructed of glass. However, any other suitable material which has no harmful effect upon the course of the chlorination reaction, and which at the same time is substantially unaffected by chlorine, may be utilized.

Although I prefer to chlorinate the nitromethane salt immediately after its formation, it is not imperative to do so in order to obtain yields of chloronitromethane which are in substantial excess of those secured by prior procedures, since I have found that the concentration of the nitromethane salt solution and the temperature at which said solution is allowed to stand, are factors which must be taken into consideration insofar as the stability of such salts is concerned. For example, dilute salt solutions, on standing at temperatures not in appreciable excess of 10° C., have been found to be considerably more stable than nitromethane salt solutions of greater concentration stored under similar conditions of both time and temperature. In this connection it is to be understood that the expression "freshly prepared," appearing in certain of the appended claims, is to be construed as pertaining only to those salt solutions which have been prepared immediately prior to chlorination, or to salt solutions of such a degree of dilution that the yield of chloronitromethane obtainable therefrom, is not materially decreased by allowing said dilute solutions to stand for a period of one hour, at a temperature not in excess of 10° C.

My invention may be more particularly illustrated by the following specific examples.

*Example I*

Nineteen hundred eighty-seven parts of 1.64 molar aqueous nitromethane and 1457 parts of 2.182 molar aqueous sodium hydroxide were separately cooled to a temperature of 10° C., and then simultaneously introduced, in approximately equivalent quantities, into a water-cooled reaction chamber. The solution of the salt thus formed was then chlorinated by dropping said solution into a water-cooled tube-type chlorinator, at the bottom of which chlorine was lead in through a fritted glass disk at a rate such that the temperature of the aqueous reaction medium did not rise in excess of 30° C. As the reaction proceeded, the liquid level in the chlorinator rose gradually up to the side arm located near the top thereof, and the aqueous reaction medium containing chloronitromethane, with withdrawn. After the entire volume of nitromethane and sodium hydroxide solutions had been added, the introduction of chlorine was stopped, and the liquid obtained from the chlorinator, steam distilled. A small fraction was collected at 79–86° C., and consisted principally of nitromethane and chloropicrin, while the major portion of the material obtained by steam distillation, constituting chiefly chloronitromethane, was collected at 86–100° C. The oil layer of the latter friction was separated, dried over calcium chloride, and distilled at 52° C. (20 mm.). The chloronitromethane, obtained in this manner, amounted to 234 parts, corresponding to an 83% yield. On analysis, the following physical constants were determined.

Specific gravity 20°/20°_____ 1.4576
Refractive index 20°_____ 1.44072
Chlorine_____ Per cent by weight (theory 37.2), found 37.8.

In order to specifically demonstrate the influence of time upon the alkali metal salts of nitromethane, the following examples are included.

*Example II*

One hundred parts of 1.31 molar aqueous nitromethane solution and 42.5 parts of 3.09 normal aqueous sodium hydroxide solution were each cooled to 10° C. in an ice bath, and mixed. The resulting mixture was then subjected to chlorination under conditions similar to those described in Example I. When approximately all of said mixture had been added, a second salt solution was prepared and added in the same manner. This procedure was continued until a total of 80 parts of nitromethane had been added. The products were then recovered and distilled, as described in Example I. On steam distilling up to 86° C., an oil layer was obtained, which amounted to 14.8 parts, and consisted of chloropicrin and nitromethane. By further distillation at a temperature of from 86–100° C., an oil layer, consisting of chloronitromethane, was obtained, which amounted to 81.6 parts, corresponding to a yield of 64.7%.

*Example III*

Four hundred twenty-five parts of 3.09 normal aqueous sodium hydroxide solution and 1000 parts of 1.31 molar aqueous nitromethane solution (containing 80 parts of nitromethane) were each cooled to a temperature of 10° C., and mixed, after which the resulting solution was maintained at a tempearture of 10° C., for a period of one hour. This solution was then chlorinated, and the products recovered in accordance with the procedure described in Example I. On steam distillation up to 86° C., an oil layer was obtained, which amounted to 15 parts, and was found to consist of chloropicrin and nitromethane. By further steam distillation at a temperature of from 86–100° C., an oil layer, consisting of chloronitromethane, was obtained, which amounted to 18.1 parts, corresponding to a yield of 14.5%.

It will be obvious to those skilled in the art that numerous modifications exist in the procedure employed in carrying out my invention, such as, for example, any of the alkaline earth metal salts of nitromethane may be employed, and it is to be understood that such salts are to be regarded as equivalents in my process. Such modifications or any equivalents thereof which would naturally occur to those skilled in the art, are to be considered as lying without the scope of my invention.

Having now described my invention, what I claim is:

1. In the process for the preparation of a monohalonitromethane by halogenating an aqueous solution of a basic metal salt of nitromethane, the improvement which comprises increasing the yield by inhibiting the formation of polyhalogenated nitromethanes by simultaneously bringing in contact approximately equivalent reacting molar quantities of an aqueous solution of nitromethane and an alkali metal hydroxide while simultaneously halogenating the resultant salt as formed, before any substantial decomposition thereof, there being substantially no excess basic material present as halogenation occurs.

2. In the process for the preparation of a monohalonitromethane by halogenating an aqueous solution of a basic metal salt of nitromethane, the improvement which comprises increasing the yield by inhibiting the formation of polyhalogenated nitromethanes by simultaneously bringing in contact approximately equivalent reacting molar quantities of an aqueous solution of nitromethane and a basic compound selected from the group consisting of alkali metal hydroxides and alkaline earth metal hydroxides while simultaneously halogenating the resultant salt as formed, before any substantial decomposition thereof, there being substantially no excess basic material present as halogenation occurs.

3. In the process for the preparation of monochloronitromethane by chlorinating an aqueous solution of a sodium salt of nitromethane, the improvement which comprises increasing the yield by inhibiting the formation of polychloronitromethanes by introducing separately and simultaneously into a reaction chamber approximately equivalent reacting molar quantities of aqueous solutions of nitromethane and sodium hydroxide while simultaneously subjecting the resultant salt as formed, and before any substantial decomposition thereof, to the action of elemental chlorine, there being substantially no excess sodium hydroxide present as chlorination occurs, and maintaining the chlorination reaction at a temperature not in substantial excess of 50° C.

JOHN B. TINDALL.

---

CERTIFICATE OF CORRECTION.

Patent No. 2,309,806.  February 2, 1943.

JOHN B. TINDALL.

It is hereby certified that error appears in the printed specification of the above numbered patent requiring correction as follows: Page 2, second column, line 14, for "with" read --was--; page 2, second column, line 24, for "friction" read --fraction--; page 3, first column, line 15, for "without" read --within--; and that the said Letters Patent should be read with this correction therein that the same may conform to the record of the case in the Patent Office.

Signed and sealed this 20th day of April, A. D. 1943.

Henry Van Arsdale,
Acting Commissioner of Patents.

(Seal)

CERTIFICATE OF CORRECTION.

Patent No. 2,309,806. February 2, 1943.

JOHN B. TINDALL.

It is hereby certified that error appears in the printed specification of the above numbered patent requiring correction as follows: Page 2, second column, line 14, for "with" read --was--; page 2, second column, line 24, for "friction" read --fraction--; page 3, first column, line 15, for "without" read --within--; and that the said Letters Patent should be read with this correction therein that the same may conform to the record of the case in the Patent Office.

Signed and sealed this 20th day of April, A. D. 1943.

(Seal)
Henry Van Arsdale,
Acting Commissioner of Patents.